US012144098B2

(12) United States Patent
Yamaguchi et al.

(10) Patent No.: US 12,144,098 B2
(45) Date of Patent: Nov. 12, 2024

(54) PLASMA TORCH AND CENTER PIPE FOR PLASMA TORCH

(71) Applicant: KOMATSU INDUSTRIES CORPORATION, Kanazawa (JP)

(72) Inventors: Yoshihiro Yamaguchi, Ishikawa (JP); Nobuhiro Takata, Ishikawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 708 days.

(21) Appl. No.: 17/396,002

(22) Filed: Aug. 6, 2021

(65) Prior Publication Data

US 2022/0124902 A1 Apr. 21, 2022

(30) Foreign Application Priority Data

Oct. 19, 2020 (JP) ................................ 2020-175157

(51) Int. Cl.
*H05H 1/28* (2006.01)
*B23K 9/28* (2006.01)
*B23K 10/00* (2006.01)

(52) U.S. Cl.
CPC ............... *H05H 1/28* (2013.01); *B23K 9/285* (2013.01); *B23K 10/00* (2013.01)

(58) Field of Classification Search
CPC ........ H05H 1/28; H05H 1/3436; B23K 9/285; B23K 10/00
See application file for complete search history.

(56) References Cited

U.S. PATENT DOCUMENTS 4,059,743 A * 11/1977 Esibian .................. B23K 10/02 219/121.36
4,311,897 A * 1/1982 Yerushalmy ......... H05H 1/3423 219/121.48
5,206,481 A * 4/1993 Rossner ................... H05H 1/28 219/121.48
5,406,047 A * 4/1995 Katschinski ............. H05H 1/34 219/121.36
6,320,156 B1 * 11/2001 Yamaguchi .............. H05H 1/34
2004/0200810 A1 10/2004 Brandt et al.
2017/0182585 A1 * 6/2017 Yamaguchi .............. H05H 1/28

FOREIGN PATENT DOCUMENTS

JP 2006-523006 A 10/2006

* cited by examiner

*Primary Examiner* — Helena Kosanovic
*Assistant Examiner* — Thao Uyen Tran-Le
(74) *Attorney, Agent, or Firm* — Global IP Counselors, LLP

(57) ABSTRACT

A plasma torch includes an electrode, a center pipe, and a coolant passage. The electrode includes an internal passage, a tip portion, a convex portion, and an electrode insert. The center pipe is at least partially arranged in the internal passage of the electrode. The center pipe includes first and second pipe ends. The coolant passage first, second, third, and fourth passages. A coolant flows from the first passage through the second passage and the third passage to the fourth passage. At least a part of the convex portion is arranged in the center pipe. The inner surface of the center pipe includes a first inclined surface having a diameter that decreases toward a distal direction. The distal direction is a direction extending from the second pipe end to the first pipe end. The first inclined surface extends toward the root portion of the convex portion.

7 Claims, 5 Drawing Sheets

1 31 30 32 14 3 38 W5 36 63 12 5 4 64 13 9 8 10 65 10a 8a 62 5a 4a 6 W4 7 37 W3 W2 33 11 34 W1 A2 A1

PLASMA TORCH AND CENTER PIPE FOR PLASMA TORCH

CROSS-REFERENCE TO RELATED APPLICATION

This application claims priority to Japanese Patent Application No. 2020-175157, filed Oct. 19, 2020. The contents of that application are incorporated by reference herein in their entire.

BACKGROUND

Field of the Invention

The present invention relates to a plasma torch and a center pipe for a plasma torch.

Background Information

A plasma torch generates an arc between an electrode and a work. The plasma torch generates a high-temperature and high-speed plasma arc suitable for cutting the work by narrowing the arc finely with a nozzle. For example, as illustrated in Japanese Patent Publication No. 2006-523006, an inside of an electrode is hollow, and a center pipe is arranged in the electrode. A convex portion is provided on an inner surface of a tip portion of the electrode. A recess is provided on an outer surface of the tip portion of the electrode. An electrode insert such as hafnium is arranged in the recess. A part of the convex portion is arranged in the center pipe.

The electrode and the center pipe form a coolant passage. The coolant passage includes a passage in the center pipe and a passage between an outer surface of the center pipe and the inner surface of the electrode. The electrode are cooled as the coolant flows through the coolant passage.

SUMMARY

Since the electrode become hot, the plasma torch is required to have a high cooling capacity for the electrode. In particular, it is desired to improve the cooling capacity in order to prevent the life of the electrode from being shortened by increasing the output of the plasma torch. An object of the present disclosure is to improve a cooling capacity of an electrode in a plasma torch.

A plasma torch according to one aspect of the present disclosure includes an electrode, a center pipe, and a coolant passage. The electrode includes an internal passage, a tip portion, a convex portion, and an electrode insert. The internal passage extends in an axial direction of the electrode. The tip portion closes the internal passage. The convex portion includes a root portion connected to an inner surface of the tip portion. The convex portion protrudes from the inner surface of the tip portion. At least a part of the electrode insert is arranged in the convex portion. The center pipe includes a first pipe end and a second pipe end. The first pipe end faces the inner surface of the tip portion in the axial direction. The second pipe end is located opposite to the first pipe end. At least a part of the center pipe is arranged in the internal passage of the electrode.

The coolant passage includes a first passage, a second passage, a third passage, and a fourth passage. The first passage is arranged in the center pipe. The second passage is arranged between an inner surface of the center pipe and the convex portion. The third passage is arranged between the first pipe end and the inner surface of the tip portion. The fourth passage is arranged between an outer surface of the center pipe and an inner surface of the electrode. A coolant flows from the first passage through the second passage and the third passage to the fourth passage. At least a part of the convex portion is arranged in the center pipe. The inner surface of the center pipe includes a first inclined surface having a diameter that decreases toward a distal direction. The distal direction is a direction from the second pipe end to the first pipe end. The first inclined surface extends toward the root portion of the convex portion.

According to the plasma torch according to the present aspect, the coolant passage is narrowed by the first inclined surface. As a result, a flow rate of the coolant increases. Further, the coolant is guided to the root portion of the convex portion of the electrode by the first inclined surface. Since the root portion of the convex portion is close to the electrode insert in which an arc is generated, the temperature tends to be high. Therefore, the electrode can be effectively cooled by guiding the coolant to the root portion by the first inclined surface. As a result, the cooling capacity for the electrode is improved.

A center pipe for a plasma torch according to another aspect of the present disclosure includes a first pipe end, a second pipe end, a first inclined surface, and a second inclined surface. The second pipe end is located opposite to the first pipe end. The first inclined surface is provided on an inner surface of the center pipe. A diameter of the first inclined surface decreases toward a distal direction. The distal direction is a direction from the second pipe end to the first pipe end. The second inclined surface is provided on the inner surface of the center pipe. The second inclined surface is arranged in a direction opposite to the distal direction with respect to the first inclined surface. The second inclined surface expands toward the distal direction.

According to the center pipe according to the present aspect, in the plasma torch, the coolant passage is narrowed by the first inclined surface. As a result, a flow rate of the coolant increases. Further, the coolant is guided to the convex portion of the electrode by the first inclined surface. Since the convex portion is close to the tip portion of the electrode where an arc is generated, the temperature tends to be high. Therefore, the electrode can be effectively cooled by guiding the coolant to the convex portion by the first inclined surface. As a result, the cooling capacity for the electrode is improved. Further, the second inclined surface expands the coolant passage. Therefore, the coolant passage is narrowed by the first inclined surface but an increase in pressure loss can be suppressed. As a result, a load on a pump for supplying the coolant is reduced.

DETAILED DESCRIPTION OF EMBODIMENT(S)

Figure 1:
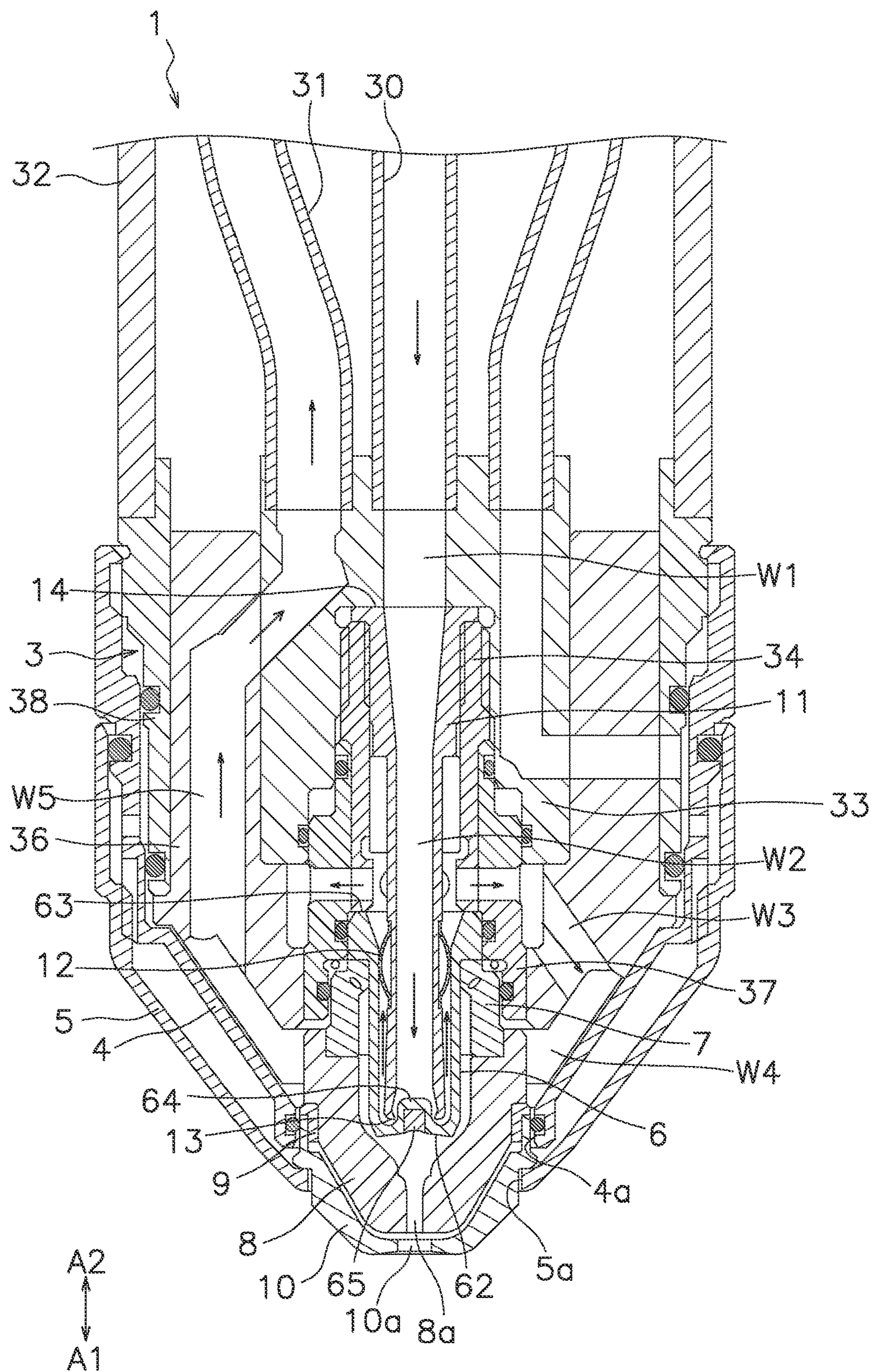
FIG. 1 is a cross-sectional view taken along a central axis of a plasma torch according to an embodiment.

Hereinafter, a plasma torch according to an embodiment will be described with reference to the drawings. FIG. 1 is a cross-sectional view taken along a central axis of the plasma torch 1 according to the embodiment. In the present embodiment, the plasma torch 1 is a plasma torch for oxygen plasma cutting. However, the plasma torch 1 may be a plasma torch for plasma cutting using a gas containing no oxygen such as nitrogen or argon gas.

The plasma torch 1 includes a torch body 3, a first retainer cap 4, a second retainer cap 5, an electrode 6, an insulating guide 7, a nozzle 8, an insulating ring 9, and a shield cap 10. The torch body 3 is attached to a connecting pipe 32. The torch body 3 includes a base 33, an electrode mount 34, a nozzle mount 36, an insulating sleeve 37, and a holder 38. The base 33, the electrode mount 34, the nozzle mount 36, the insulating sleeve 37, and the holder 38 are arranged concentrically with the central axis of the plasma torch 1.

The base 33 has a cylindrical shape. The base 33 is made of an electric conductor. The electrode mount 34 and the insulating sleeve 37 are inserted into a hole of the base 33. The electrode mount 34 has a circular tubular shape. The electrode mount 34 is made of an electric conductor. The base 33 is electrically connected to a cable from a power source (not illustrated).

The insulating sleeve 37 has a circular tubular shape. The insulating sleeve 37 is made of an insulator. A part of the insulating sleeve 37 is arranged in the hole of the base 33. The insulating sleeve 37 is located between the electrode mount 34 and the nozzle mount 36.

The nozzle mount 36 has a circular tubular shape. The nozzle mount 36 is made of an insulator. A contactor (not illustrated) that electrically contacts the nozzle is attached to the nozzle mount 36. The contactor are electrically connected to the cable from the power supply. The base 33 is inserted into a hole of the nozzle mount 36. The insulating sleeve 37 is inserted into the hole of the nozzle mount 36. A tip portion of the insulating sleeve 37 protrudes from the base 33 and is arranged in the hole of the nozzle mount 36.

The holder 38 has a circular tubular shape. The holder 38 is attached to the connecting pipe 32 by means such as adhesion. The nozzle mount 36 is inserted into a hole of the holder 38. A tip portion of the nozzle mount 36 projects from the holder 38.

The first retainer cap 4 has a cylindrical shape with a tapered tip portion. The first retainer cap 4 is attached to the torch body 3 so as to cover the nozzle mount 36. The tip portion of the first retainer cap 4 has an opening 4*a* into which the shield cap 10 is inserted. The holder 38 and the nozzle mount 36 are arranged in the first retainer cap 4. The first retainer cap 4 is attached to the holder 38.

The second retainer cap 5 has a cylindrical shape with a tapered tip portion. The tip portion of the second retainer cap 5 has an opening 5*a* into which the shield cap 10 is inserted. The second retainer cap 5 is attached to the first retainer cap 4 so as to cover the first retainer cap 4. The first retainer cap 4 is arranged in the second retainer cap 5. The second retainer cap 5 is attached to the first retainer cap 4.

The electrode 6, the insulating guide 7, the nozzle 8, the insulating ring 9, and the shield cap 10 are arranged concentrically with each other. The axes of the electrode 6, the insulating guide 7, the nozzle 8, the insulating ring 9, and the shield cap 10 coincide with the central axis of the plasma torch 1. The electrode 6 has a cylindrical shape. The electrode 6 is made of an electric conductor. A part of the electrode 6 is arranged in a hole of the insulating guide 7. The electrode 6 is joined to the insulating guide 7. The electrode 6 will be described in detail later.

The insulating guide 7 electrically insulates the electrode 6 and the nozzle 8 and connects the electrode 6 and the nozzle 8. The insulating guide 7 positions the electrode 6 and the nozzle 8 with each other in the axial direction and the radial direction. The axial direction is the vertical direction in FIG. 1. The radial direction is the left-right direction in FIG. 1. The insulating guide 7 has a tubular shape. The insulating guide 7 is made of an insulator. The nozzle 8 has a cylindrical shape with a tapered tip portion. The nozzle 8 is joined to the insulating guide 7. The nozzle 8 includes an injection hole 8*a*. The injection hole 8*a* extends in the axial direction of the nozzle 8 and reaches the tip of the nozzle 8.

The insulating ring 9 is joined to the nozzle 8. The shield cap 10 covers the nozzle 8. The shield cap 10 is joined to the insulating ring 9. The shield cap 10 includes an injection hole 10*a*. The injection hole 10*a* of the shield cap 10 and the injection hole 8*a* of the nozzle 8 are arranged concentrically with each other.

The plasma torch 1 includes a center pipe 11. The center pipe 11 is inserted into a hole of the electrode mount 34. The center pipe 11 projects from the tip of the nozzle mount 36. At least a part of the center pipe 11 is arranged in the electrode 6. The center pipe 11 is arranged concentrically with the electrode 6. The center pipe 11 supplies the coolant into the electrode 6.

The center pipe 11 is made of an electric conductor. The center pipe 11 is in contact with the electrode mount 34 and is electrically connected to the electrode mount 34. A contactor 12 is attached to an outer surface of the center pipe 11. The contactor 12 is made of an electric conductor. The contactor 12 is in contact with the inner surface of the electrode 6. The contactor 12 electrically connects the electrode 6 and the center pipe 11.

The center pipe 11 includes a first pipe end 13 and a second pipe end 14. The first pipe end 13 faces the inner surface of the tip portion 62 in the axial direction. The first pipe end 13 is arranged with a gap with respect to the inner surface of the tip portion 62. The second pipe end 14 is located opposite to the first pipe end 13 in the axial direction. In the following description, a direction from the second pipe end 14 to the first pipe end 13 in the axial direction is defined as a "distal direction A1". A direction from the first pipe end 13 to the second pipe end 14 in the axial direction, that is, a direction opposite to the distal direction A1, is defined as a "proximal direction A2".

Figure 2:
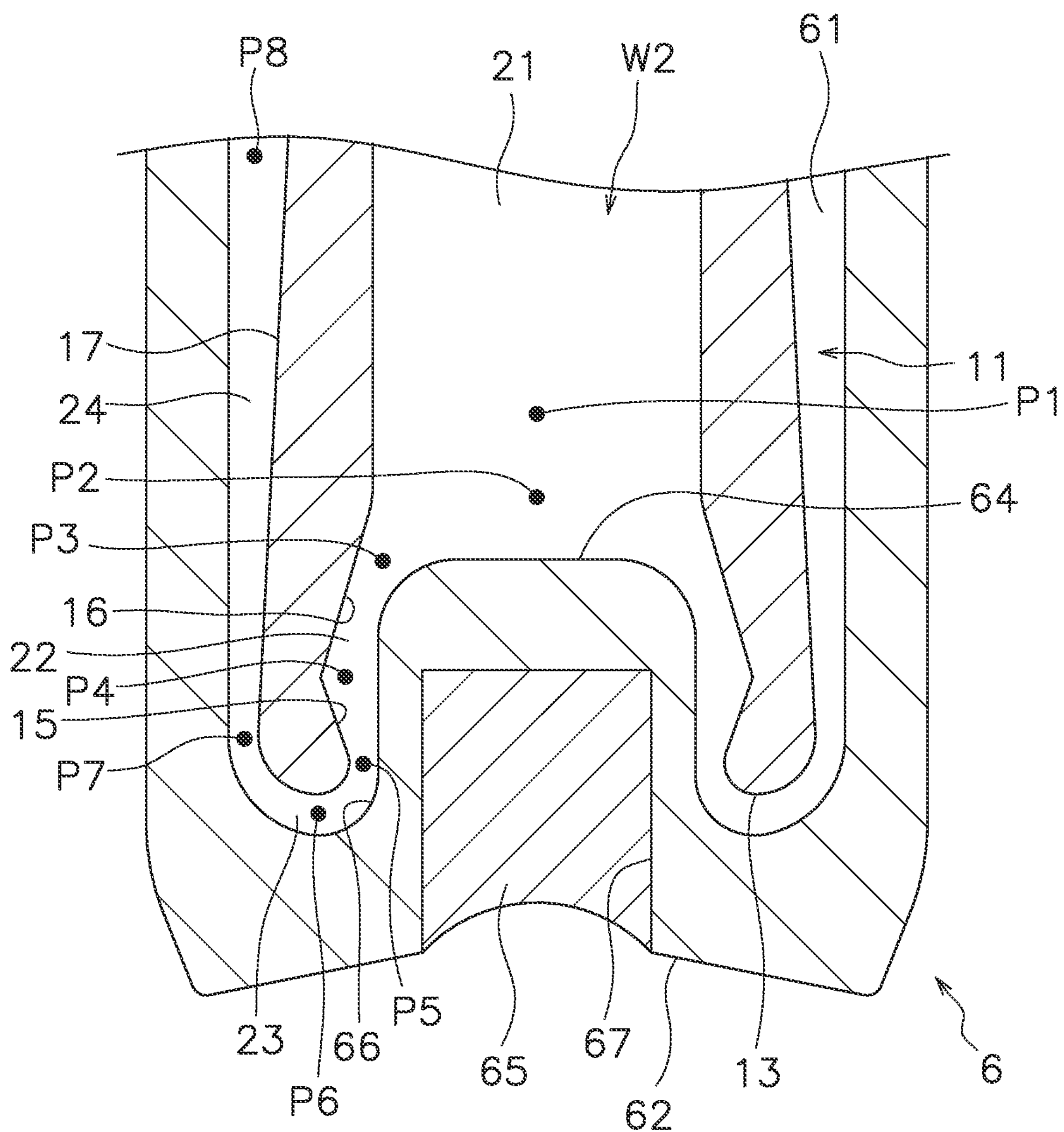
FIG. 2 is an enlarged view of an electrode and a center pipe.

FIG. 2 is an enlarged view of the electrode 6 and the center pipe 11. As illustrated in FIGS. 1 and 2, the electrode 6 includes an internal passage 61, a tip portion 62, a base end portion 63, a convex portion 64, and an electrode insert 65. The internal passage 61 extends in the axial direction of the electrode 6. The tip portion 62 closes the internal passage 61. As illustrated in FIG. 1, the tip portion 62 is arranged in the nozzle 8. The internal passage 61 is open at the base end portion 63.

As illustrated in FIG. 2, the convex portion 64 is arranged in the internal passage 61. The convex portion 64 projects from the inner surface of the tip portion 62. The convex portion 64 projects toward the proximal direction A2. The convex portion 64 includes a root portion 66. The root portion 66 is connected to the inner surface of the tip portion 62. The outer surface of the tip portion 62 includes a recess 67. The recess 67 is recessed toward the proximal direction A2. The electrode insert 65 is arranged in the recess 67. At least a part of the electrode insert 65 is arranged in the convex portion 64. The electrode insert 65 is made of a material used as a plasma electrode such as hafnium. The electrode insert 65 has a shape recessed from the tip portion 62. As a result, the gas flow is separated at the edge of the recess 67, so that the diffusion of the metal vapor of the electrode insert 65 is suppressed. As a result, the consumption of the electrode 6 is suppressed. However, the shape of the electrode insert 65 is not limited to the above, and may be changed.

At least a part of the convex portion 64 is arranged in the center pipe 11. The inner surface of the center pipe 11 is arranged with a gap with respect to the convex portion 64. The inner surface of the center pipe 11 includes a first inclined surface 15 and a second inclined surface 16. The first inclined surface 15 is arranged with a gap with respect to the convex portion 64 in the radial direction. The diameter of the first inclined surface 15 decreases toward the distal direction A1. The first inclined surface 15 is inclined radially inward toward the distal direction A1. The first inclined surface 15 is inclined so as to approach the convex portion 64 toward the distal direction A1.

The first inclined surface 15 extends toward the root portion 66 of the convex portion 64. For example, the extension line of the first inclined surface 15 overlaps with the root portion 66 of the convex portion 64. At least a part of the first inclined surface 15 faces the convex portion 64 in the radial direction. In the present embodiment, the entire first inclined surface 15 faces the convex portion 64 in the radial direction. At least a part of the first inclined surface 15 is arranged at a position aligned with the electrode insert 65 in the radial direction of the electrode 6. In other words, at least a part of the first inclined surface 15 overlaps with the electrode insert 65 when viewed from the radial direction of the electrode 6. In the present embodiment, the entire first inclined surface 15 is arranged at a position aligned with the electrode insert 65 in the radial direction of the electrode 6.

The second inclined surface 16 is arranged in the proximal direction A2 with respect to the first inclined surface 15. The second inclined surface 16 is connected to the first inclined surface 15. The second inclined surface 16 is arranged with a gap with respect to the convex portion 64 in the radial direction. The diameter of the second inclined surface 16 increases toward the distal direction A1. The second inclined surface 16 is inclined radially outward toward the distal direction A1. The second inclined surface 16 is inclined so as to be separated from the convex portion 64 toward the distal direction A1.

A part of the second inclined surface 16 faces the convex portion 64 in the radial direction of the electrode 6. The remaining portion of the second inclined surface 16 is arranged at a position not facing the convex portion 64 in the radial direction of the electrode 6. That is, the remaining portion of the second inclined surface 16 is located in the proximal direction A2 with respect to the convex portion 64. The inclination angle of the first inclined surface 15 with respect to the axial direction of the center pipe 11 is larger than the inclined angle of the second inclined surface 16 with respect to the axial direction. In the axial direction of the center pipe 11, the second inclined surface 16 is longer than the first inclined surface 15.

The outer surface of the center pipe 11 is arranged with a gap with respect to the inner surface of the electrode 6. The outer surface of the center pipe 11 includes a third inclined surface 17. The diameter of the third inclined surface 17 decreases toward the proximal direction A2. The third inclined surface 17 is inclined radially inward toward the proximal direction A2. The third inclined surface 17 is inclined so as to be separated from the inner surface of the electrode 6 toward the proximal direction A2.

Next, a coolant passage of the plasma torch 1 will be described. In FIG. 1, the solid arrow indicates the flow of the coolant. As illustrated in FIG. 1, a coolant supply pipe 30 and a coolant discharge pipe 31 are connected to the torch body 3. The coolant is supplied to the plasma torch 1 from a coolant supply source (not illustrated) through the coolant supply pipe 30 by a pump. The coolant is supplied from a first coolant passage W1 in the torch body 3 to a second coolant passage W2. The second coolant passage W2 is formed by the electrode 6 and the center pipe 11. The second coolant passage W2 will be described in detail later. The coolant is supplied from the second coolant passage W2 to a fourth coolant passage W4 through a third coolant passage W3 in the torch body 3. The fourth coolant passage W4 passes between the first retainer cap 4 and the nozzle 8. The coolant is discharged from the fourth coolant passage W4 through a fifth coolant passage W5 in the torch body 3 to the coolant discharge pipe 31.

Next, the second coolant passage W2 will be described. As illustrated in FIG. 2, the second coolant passage W2 includes a first passage 21, a second passage 22, a third passage 23, and a fourth passage 24. The first passage 21 is arranged in the center pipe 11. The second passage 22 is arranged between the inner surface of the center pipe 11 and the convex portion 64. The third passage 23 is arranged between the first pipe end 13 and the inner surface of the tip portion 62. The fourth passage 24 is arranged between the outer surface of the center pipe 11 and the inner surface of the electrode 6. The coolant flows from the first passage 21 through the second passage 22 and the third passage 23 to the fourth passage 24.

Figure 3:
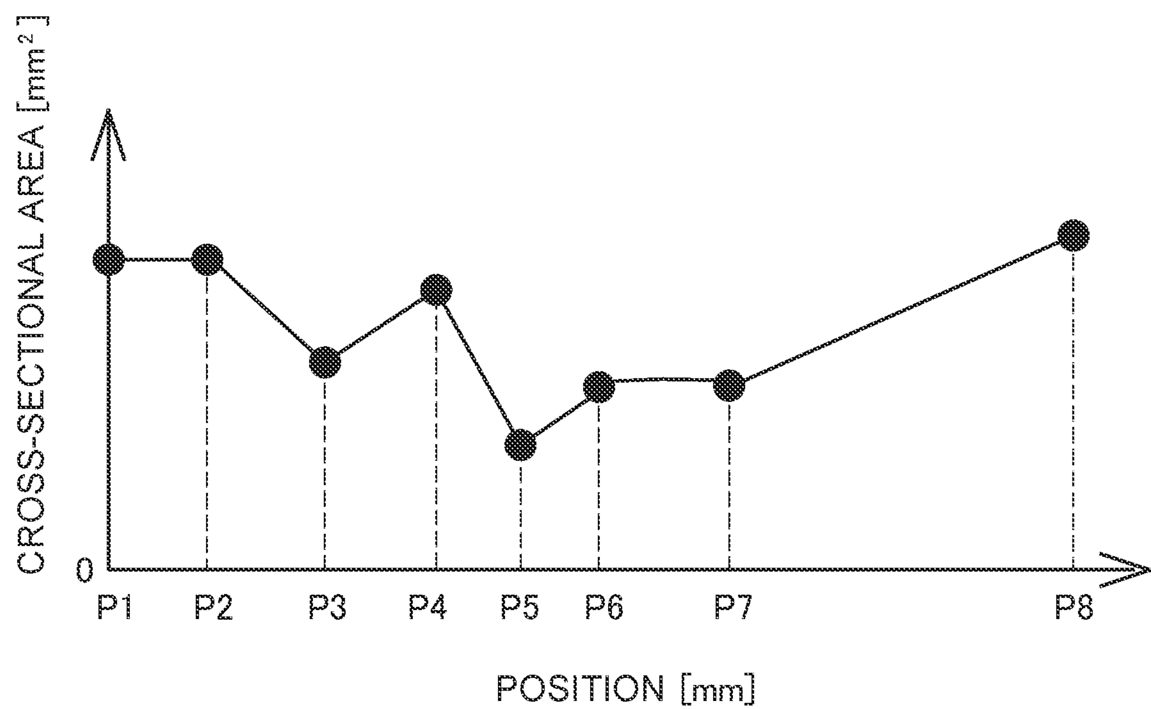
FIG. 3 is a diagram showing a cross-sectional area of a second coolant passage at a plurality of positions in the second coolant passage.

FIG. 3 is a diagram showing a cross-sectional area of the second coolant passage W2 at positions P1 to P8 in the second coolant passage W2. The cross-sectional area of the second coolant passage W2 means the area of the second coolant passage W2 in the cross section perpendicular to the axis of the center pipe 11. As illustrated in FIG. 3, the first position P1 and the second position P2 are located in the first passage 21. The cross-sectional area of the first passage 21 is constant between the first position P1 and the second position P2.

The third position P3, the fourth position P4, and the fifth position P5 are located in the second passage 22. The third position P3 is located between the second inclined surface 16 and the convex portion 64. The fifth position P5 is located between the first inclined surface 15 and the convex portion 64. The fourth position P4 is located between the third position and the fifth position. The fourth position P4 is located between the convex portion 64 and a boundary position between the first inclined surface 15 and the second inclined surface 16.

Between the third position P3 and the fourth position P4, the cross-sectional area of the second passage 22 increases toward the distal direction A1. That is, the second passage 22 has a cross-sectional area that increases toward the distal direction A1 between the second inclined surface 16 and the convex portion 64. Between the fourth position P4 and the fifth position P5, the cross-sectional area of the second passage 22 decreases toward the distal direction A1. That is, the second passage 22 has a cross-sectional area between the first inclined surface 15 and the convex portion 64 that decreases toward the distal direction A1. The cross-sectional area of the second passage 22 at the fifth position P5 is smaller than the cross-sectional area of the second passage 22 at the position P3.

The sixth position P6 is located in the third passage 23. Between the fifth position P5 and the sixth position P6, the cross-sectional area of the third passage 23 increases toward the distal direction A1. The seventh position P7 and the eighth position P8 are located in the fourth passage 24. Between the seventh position P7 and the eighth position P8, the cross-sectional area of the fourth passage 24 increases toward the proximal direction A2. That is, the fourth passage 24 has a cross-sectional area that increases toward the proximal direction A2. The cross-sectional area of the fourth passage 24 at the eighth position P8 is larger than the cross-sectional area of the first passage 21 at the first position P1.

In the plasma torch 1 according to the present embodiment described above, the second passage 22 has a cross-sectional area that decreases toward the distal direction A1 between the first inclined surface 15 and the convex portion 64. As a result, the flow rate of the coolant increases. Further, the coolant is guided to the root portion 66 of the convex portion 64 of the electrode 6 by the first inclined surface 15. Since the root portion 66 of the convex portion 64 is close to the electrode insert 65 in which an arc is generated, the temperature tends to be high. Therefore, the electrode 6 can be effectively cooled by guiding the coolant to the root portion 66 by the first inclined surface 15. As a result, the cooling capacity for the electrode 6 is improved.

The second inclined surface 16 is located upstream of the flow of the coolant with respect to the first inclined surface 15. The diameter of the second inclined surface 16 increases toward the distal direction A1. Further, the second passage 22 has a cross-sectional area that increases toward the distal direction A1 between the second inclined surface 16 and the convex portion 64. Therefore, it is possible to suppress an increase in pressure loss in the second passage 22. As a result, the load on the pump for supplying the coolant is reduced. Further, the second inclined surface 16 is separated from the electrode insert 65 as compared with the first inclined surface 15. Therefore, even if the flow velocity of the coolant decreases between the second inclined surface 16 and the convex portion 64, the decrease in the cooling capacity for the electrode 6 can be suppressed.

Although one embodiment of the present invention has been described above, the present invention is not limited to the above embodiment, and various modifications can be made without departing from the gist of the invention.

The structure of the plasma torch is not limited to that of the above embodiment, and may be changed. For example, the structures of the torch body 3, the first retainer cap 4, the second retainer cap 5, the electrode 6, the insulating guide 7, the nozzle 8, the insulating ring 9, and the shield cap 10 may be changed. The center pipe 11 may be electrically connected to the electrode 6 without the contactor 12.

Figure 4:
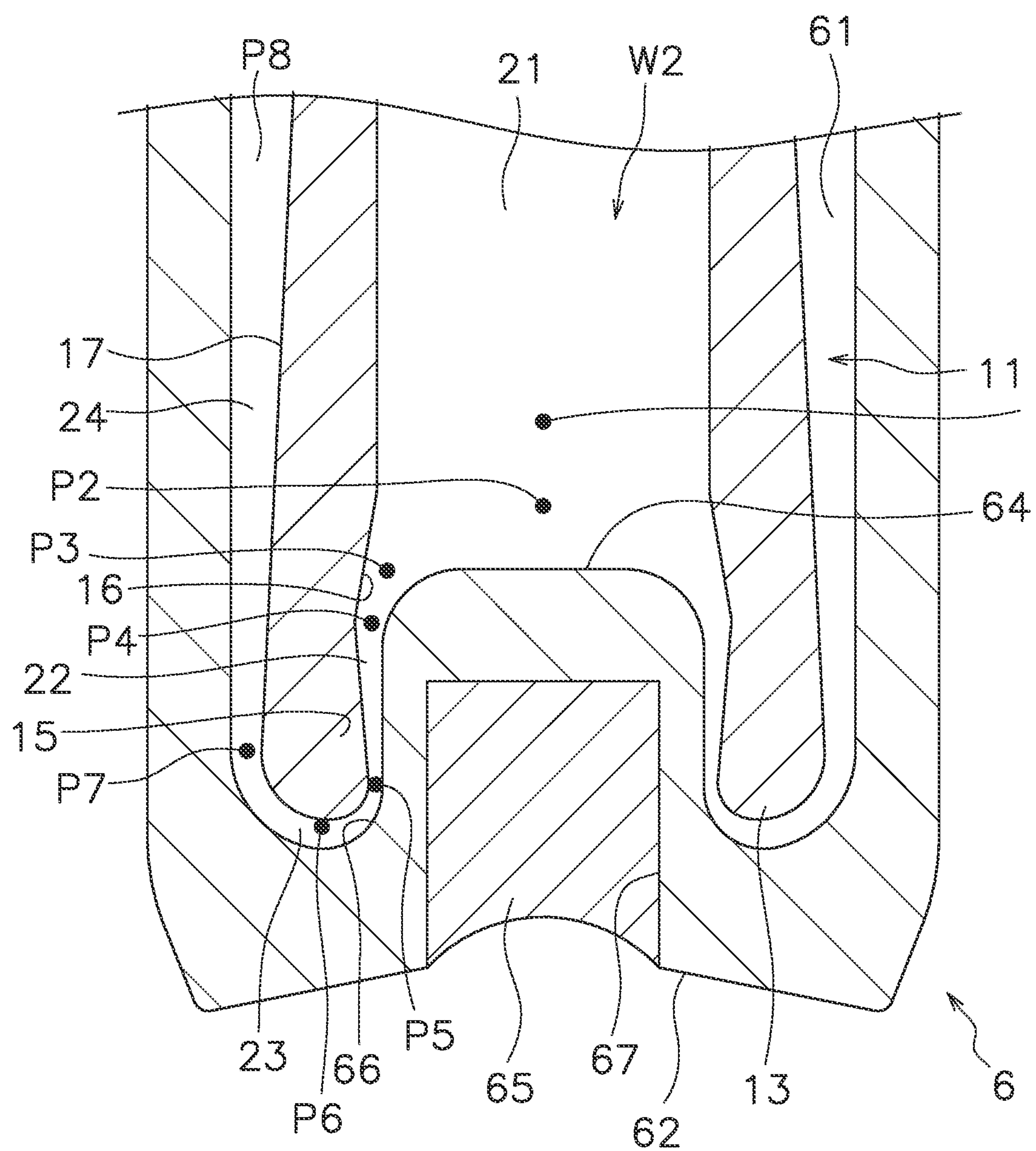
FIG. 4 is an enlarged view of the electrode and the center pipe according to a modified example.
Figure 5:
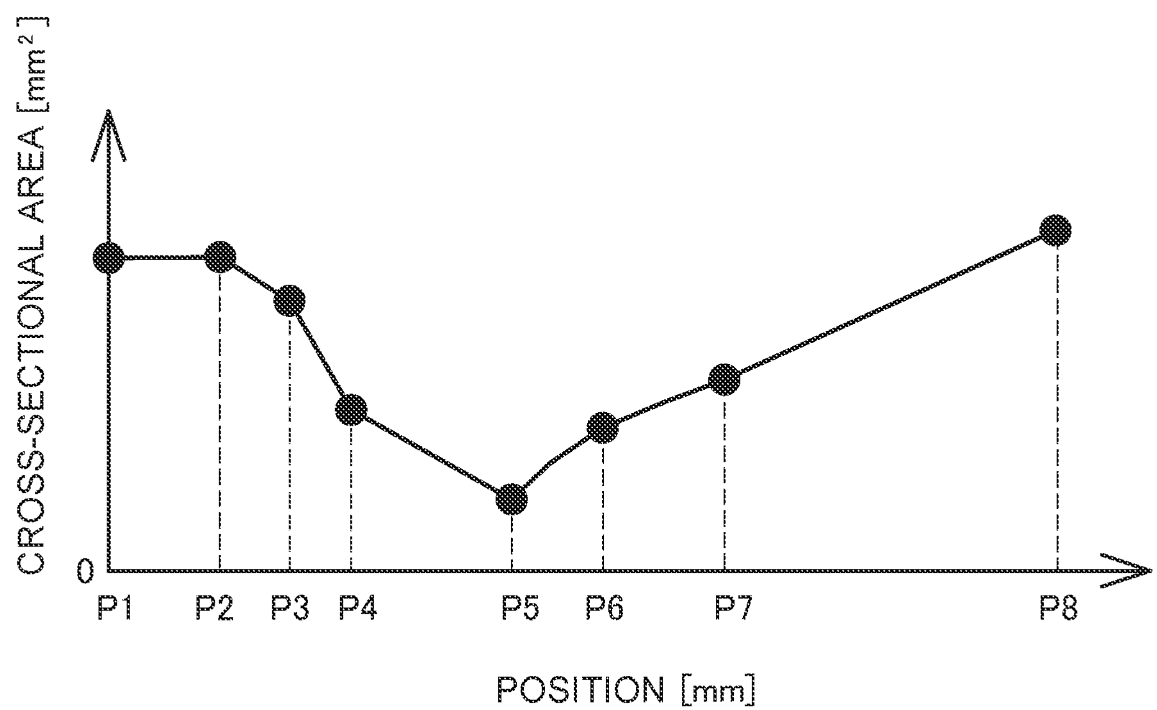
FIG. 5 is a diagram showing a cross-sectional area of the second coolant passage at a plurality of positions in the second coolant passage according to the modified example.

The structure of the center pipe 11 is not limited to that of the above embodiment, and may be changed. For example, the structures of the first inclined surface 15 and the second inclined surface 16 may be changed. FIG. 4 is a diagram showing a center pipe 11 according to a modified example. FIG. 5 is a diagram showing a cross-sectional area of the second coolant passage W2 according to the modified example. As illustrated in FIG. 4, in the center pipe 11 according to the modified example, the second inclined surface 16 is shorter than the first inclined surface 15 in the axial direction. Between the third position P3 and the fourth position P4, the cross-sectional area of the second passage 22 decreases toward the distal direction A1. That is, the second passage 22 has a cross-sectional area that decreases toward the distal direction A1 between the second inclined surface 16 and the convex portion 64. Other configurations of the center pipe 11 according to the modified example are the same as those of the center pipe 11 according to the above-described embodiment.

The invention claimed is:

1. A plasma torch comprising:

an electrode including an internal passage that extends in an axial direction of the electrode, a tip portion that closes the internal passage, a convex portion including a root portion connected to an inner surface of the tip portion, the convex portion protruding from the inner surface of the tip portion, and an electrode insert at least partially arranged in the convex portion;

a center pipe at least partially arranged in the internal passage of the electrode, the center pipe including a first pipe end that faces the inner surface of the tip portion in the axial direction, and a second pipe end located opposite to the first pipe end; and a coolant passage including a first passage arranged in the center pipe, a second passage arranged between an inner surface of the center pipe and the convex portion, a third passage arranged between the first pipe end and the inner surface of the tip portion, and a fourth passage arranged between an outer surface of the center pipe and an inner surface of the electrode a coolant flowing from the first passage through the second passage and the third passage to the fourth passage, at least a part of the convex portion being arranged in the center pipe, the inner surface of the center pipe including a first inclined surface having a diameter that decreases toward a distal direction, the distal direction being a direction extending from the second pipe end to the first pipe end, the first inclined surface extending toward the root portion of the convex portion, and the inner surface of the center pipe further including a second inclined surface extending along a direction opposite to the distal direction with respect to the first inclined surface, a diameter of the second inclined surface increasing toward the distal direction.

2. The plasma torch according to claim 1, wherein at least a part of the second inclined surface faces the convex portion in a radial direction of the electrode.

3. The plasma torch according to claim 1, wherein at least a part of the second inclined surface is arranged at a position not facing the convex portion in a radial direction of the electrode.

4. The plasma torch according to claim 1, wherein the second passage has a cross-sectional area that increases toward the distal direction between the second inclined surface and the convex portion.

5. The plasma torch according to claim 1, wherein the second passage has a cross-sectional area that decreases toward the distal direction between the first inclined surface and the convex portion.

6. The plasma torch according to claim 1, wherein the third passage has a cross-sectional area that increases in the direction opposite to the distal direction.

7. A plasma torch comprising:

an electrode including an internal passage that extends in an axial direction of the electrode, a tip portion that closes the internal passage, a convex portion including a root portion connected to an inner surface of the tip portion, the convex portion protruding from the inner surface of the tip portion, and an electrode insert at least partially arranged in the convex portion;

a center pipe at least partially arranged in the internal passage of the electrode, the center pipe including a first pipe end that faces the inner surface of the tip portion in the axial direction, and a second pipe end located opposite to the first pipe end; and a coolant passage including a first passage arranged in the center pipe, a second passage arranged between an inner surface of the center pipe and the convex portion, a third passage arranged between the first pipe end and the inner surface of the tip portion, and a fourth passage arranged between an outer surface of the center pipe and an inner surface of the electrode a coolant flowing from the first passage through the second passage and the third passage to the fourth passage, at least a part of the convex portion being arranged in the center pipe, the inner surface of the center pipe including a first inclined surface having a diameter that decreases toward a distal direction, the distal direction being a direction extending from the second pipe end to the first pipe end, the first inclined surface extending toward the root portion of the convex portion, and at least a part of the first inclined surface being arranged at a position aligned with the electrode insert in a radial direction of the electrode.

* * * * *